(12) United States Patent
Fries et al.

(10) Patent No.: US 12,432,300 B2
(45) Date of Patent: Sep. 30, 2025

(54) SYSTEM HAVING DETACHED EMERGENCY CALL UNIT FOR MOTOR VEHICLES (71) Applicant: Harman Becker Automotive Systems GmbH, Karlsbad (DE)

(72) Inventors: Dirk Fries, Straubenhardt (DE); Christian Birk, Ulm (DE)

(73) Assignee: HARMAN BECKER AUTOMOTIVE SYSTEMS GMBH, Karlsbad-Ittersbach (DE)

(*) Notice: Subject to any disclaimer, the term of this patent is extended or adjusted under 35 U.S.C. 154(b) by 383 days.

(21) Appl. No.: 18/193,476

(22) Filed: Mar. 30, 2023

(65) Prior Publication Data
US 2023/0328179 A1    Oct. 12, 2023

(30) Foreign Application Priority Data
Apr. 12, 2022 (DE) .................. 102022108871.5

(51) Int. Cl.
H04M 3/00     (2024.01)
B60R 11/02    (2006.01)
H04L 67/12    (2022.01)
H04M 3/51     (2006.01)

(52) U.S. Cl.
CPC ........... *H04M 3/5116* (2013.01); *B60R 11/02* (2013.01); *H04L 67/12* (2013.01); *B60R 2011/0294* (2013.01)

(58) Field of Classification Search
CPC ............... H04M 3/5116; B60R 11/02; B60R 2011/0294; H04L 67/12
See application file for complete search history.

(56) References Cited

U.S. PATENT DOCUMENTS

| 7,409,044 B2* | 8/2008 | Leduc | A61B 5/0022 379/106.02 |
| 8,712,367 B2* | 4/2014 | Stahlin | H04W 4/90 455/456.3 |
| 2008/0143497 A1* | 6/2008 | Wasson | G08G 1/205 340/425.5 |

(Continued)

FOREIGN PATENT DOCUMENTS

| DE | 102014003945 A1 | 9/2015 |
| DE | 102019129055 A1 | 4/2020 |

(Continued)

*Primary Examiner* — Pakee Fang
(74) *Attorney, Agent, or Firm* — McCoy Russell LLP (57) ABSTRACT The invention relates to a system for a motor vehicle having a control unit, which is connected to a communication bus of the motor vehicle, and an emergency call unit which is designed to make an emergency call to an emergency call center, wherein the emergency call unit is connected to the control unit via an interface and can operate in a first operating mode, which corresponds to the normal operation of the emergency call unit, in which the control unit controls the emergency call unit and supplies it with energy via the interface, and in a second operating mode, in which the emergency call unit is designed to make the emergency call to the emergency call center without control and energy by way of the control unit. The emergency call unit is only connected via the interface and not directly to the communication bus.

9 Claims, 8 Drawing Sheets (56) References Cited

U.S. PATENT DOCUMENTS

| | | | |
|---|---|---|---|
| 2009/0209225 A1* | 8/2009 | Sakai | G08G 1/205 |
| | | | 455/404.1 |
| 2010/0284382 A1* | 11/2010 | Stahlin | G08G 1/096725 |
| | | | 370/338 |
| 2013/0006469 A1 | 1/2013 | Green et al. | |
| 2016/0007384 A1* | 1/2016 | Dettloff | H04W 76/50 |
| | | | 455/404.1 |
| 2017/0034278 A1* | 2/2017 | Kulnick | H04L 67/12 |

FOREIGN PATENT DOCUMENTS

| | | | |
|---|---|---|---|
| EP | 2863616 A1 | 4/2015 | |
| EP | 3843286 A1 | 6/2021 | |

* cited by examiner

SYSTEM HAVING DETACHED EMERGENCY CALL UNIT FOR MOTOR VEHICLES

CROSS REFERENCE TO RELATED APPLICATIONS

The present application claims priority to German Patent Application No. 102022108871.5, entitled "SYSTEM HAVING DETACHED EMERGENCY CALL UNIT FOR MOTOR VEHICLES", and filed on Apr. 12, 2022. The entire contents of the above-listed application is hereby incorporated by reference for all purposes.

TECHNICAL FIELD

The present invention relates to a system for motor vehicles having a control unit and an emergency call unit.

BACKGROUND

Motor vehicles having emergency call units are known in the prior art, wherein the emergency call unit automatically establishes a call connection or an emergency call to an emergency call center when actuated, wherein the position of the emergency call unit is usually determined and also transmitted to the emergency call center. These units require certification and approval, wherein this certification and approval process is very time-consuming and therefore cost-intensive.

Furthermore, motor vehicles have system components for connecting to mobile radio networks, so-called telematics units. This telematics unit usually establishes the connection to mobile radio networks, to WIFI networks, and usually forms a type of router for the vehicle to access systems outside the vehicle. These units also require at least an approval and possibly also a certification.

Likewise, the emergency call unit has to meet certain requirements. The unit that provides access to mobile radio networks, etc., and the emergency call unit are usually installed in one system, which means that all components installed in this system require both approval and certification. This results in lengthy and expensive development cycles for the entire system.

In addition, a functional unit that is directly connected to the in-vehicle communication bus usually has to have extensive diagnostic capabilities. These capabilities require appropriate resources within the functional unit as well as significant implementation effort.

It is therefore an object of the present invention to alleviate the above-described disadvantages and to provide a system which can be implemented in practice with less expenditure of time and money.

SUMMARY

This object is achieved by the features of the independent claim. Preferred embodiments are described in the dependent claims.

According to a first aspect, a system for a motor vehicle is provided, wherein the system has a control unit which is connected to a communication bus of the motor vehicle. The system also has an emergency call unit which is designed to make an emergency call to an emergency call center, wherein the emergency call unit is connected to the control unit via an interface and can work in a first operating mode which corresponds to the normal operation of the emergency call unit, in which the control unit controls the emergency call unit and supplies it with energy via the interface. The emergency call unit can furthermore work in a second operating mode, in which the emergency call unit is designed to make the emergency call to the emergency call center without control and energy by way of the control unit. The emergency call unit is still only connected via the interface and not directly to the communication bus of the motor vehicle.

The control unit, which is connected to the communication bus of the motor vehicle, provides the interface for the emergency call unit, which is only connected to the control unit and not directly to the communication bus of the vehicle. Separating the emergency call unit from the other functional blocks of the control unit reduces the complexity and scope of the certification efforts and these can possibly be limited to the emergency call unit if the control unit does not contain any other certification-relevant functional blocks. In particular, the components which are connected to the communication bus of the motor vehicle have to meet certain requirements. The decoupling of the emergency call unit from this communication bus makes it possible to reduce the necessary resources and implementation efforts for the components of the emergency call unit. According to the invention, the functional blocks relevant to certification and approval are thus combined in a single unit, and the functionality of the separate unit is limited to the functions that are essential for this unit, as can be the case for the control unit. The functionality of the emergency call unit is preferably restricted only to this functionality of making the emergency call.

The emergency call unit can thus be constructed solely as an accompanying unit and is controlled and supplied with energy by the control unit in the first operating mode, i.e., the normal or default operating mode.

The emergency call unit preferably has a reserve antenna and a reserve energy supply, using which the emergency call unit makes the emergency call to the emergency call center in the second operating mode. If the control unit is no longer functional in an emergency, the emergency call unit can make the emergency call independently without the involvement of the control unit and has all the components and functions required for this.

In addition, the emergency call unit can have a position determination unit which, in the second operating mode, is designed to determine the position of the system and to send this position to the emergency call center. In this second operating mode, the emergency call unit can thus autonomously determine the position and transmit it to the emergency call center and is not dependent here on the functionality and the connection to the control unit.

In particular, the control unit preferably has a communication unit for exchanging data with a mobile radio network or for exchanging data with the Internet. The emergency call unit is designed in such a way that in the first operating mode the data is exchanged via the communication unit in the control unit. This means that in the standard operating mode, the first operating mode, the communication takes place via the control unit and not via the emergency call unit alone. Since the control unit has this communication functionality, it makes sense for the emergency call unit to also use it in the first operating mode.

The control unit preferably has a first operating unit, via which a user of the system in the first operating mode controls the emergency call unit via control commands which are transmitted to the emergency call unit via the interface. The emergency call unit preferably has a second operating unit, using which the user can operate the emergency call unit in the second operating mode, in particular if operation via the first operating unit by the control unit is not possible. In this case, the second control unit can be simpler and equipped with fewer functions than the first control unit; for example, it can only be designed as an emergency call button.

The emergency call unit can furthermore have an audio processing unit which is designed to process audio signals, wherein the emergency call unit has at least one interface for activating a loudspeaker for the output of the processed audio signals. In this case, the emergency call unit is designed to output the processed audio signals via the loudspeaker in the second operating mode and to send the processed audio signals via the interface to the control unit in the first operating mode, without output via the loudspeaker of the emergency call unit. This means that in the first operating mode, the audio communication takes place via the control unit, wherein the emergency call unit also has a loudspeaker interface in order to be able to output audio signals in the second operating mode if necessary without using the control unit, however, so that a conversation with the emergency call center is possible.

The system can also have a common antenna, which is used in the first operating mode by the emergency call unit and the control unit for communication with the mobile radio network. In this case, the system can have a splitter, which splits a received antenna signal and transmits it both to the emergency call unit and to the control unit.

Furthermore, it is possible that, in addition to the emergency call unit, the control unit also has in each case an interface for connecting a microphone for acquiring audio signals.

It is also possible for only the emergency call unit to have a microphone interface, wherein the audio signals acquired by the microphone are then transmitted to the control unit via the interface. In this case, the emergency call unit can transmit the acquired audio signals directly as analog signals via the interface to the control unit, or the emergency call unit can have an additional coding unit for the audio signals for generating digital audio signals. The emergency call unit then transmits the digital audio signals generated by the coding unit to the control unit via the interface.

The control unit can also have a WIFI interface, a Bluetooth interface, a V2X (vehicle-to-everything) communication unit, and a power supply for the control unit and the emergency call unit.

The features described above and the features described hereinafter can be used not only in the corresponding explicitly described combinations, but also in other possible combinations unless otherwise stated.

BRIEF DESCRIPTION OF THE DRAWINGS

The invention is explained in more detail hereinafter with reference to the accompanying drawings.

DETAILED DESCRIPTION

In the following, the present invention will be explained in more detail on the basis of preferred embodiments in reference to the accompanying drawings. In the figures, the same reference numerals denote the same or similar components, and the functional components used in the figures are not necessarily shown to scale. Rather, the functional components or elements shown in the figures are reproduced in such a way that the function and purpose of the respective component are comprehensible to a person skilled in the art. The connections between functional units or other elements shown in the figures can also be implemented as an indirect connection, wherein the connection can be wireless or wired. Functional units can be implemented in hardware, software, or firmware, or a combination thereof.

Figure 1:
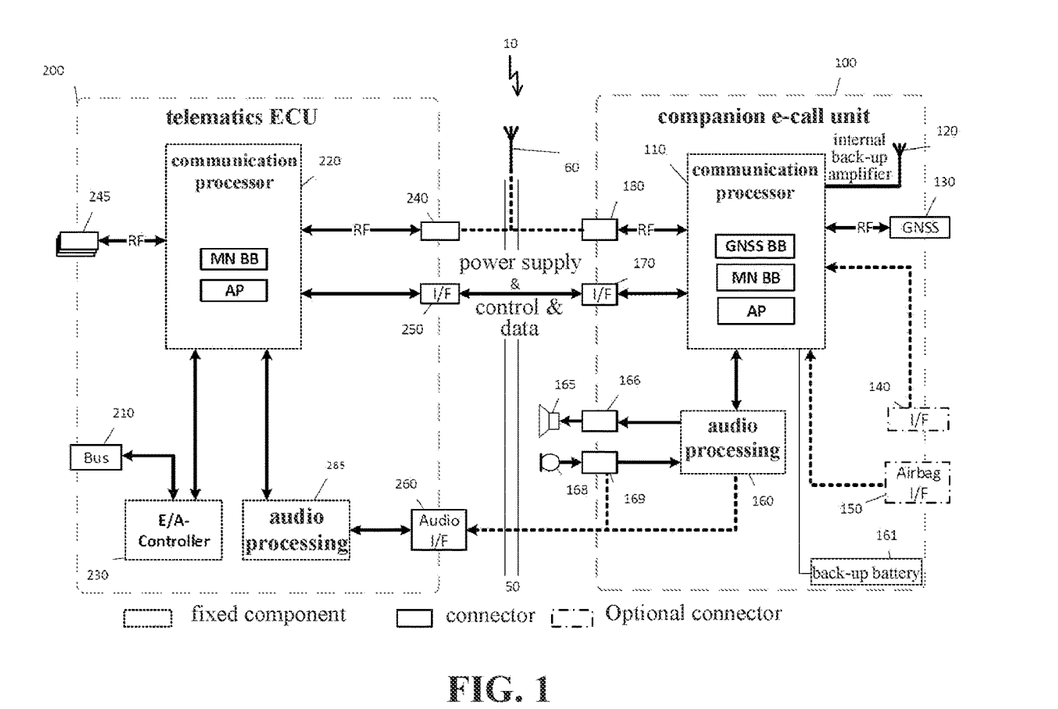
FIG. 1 schematically shows a system for motor vehicles having an emergency call unit which is only connected to a vehicle bus via a control unit.

FIG. 1 schematically shows a system 10 which has an emergency call unit 100 and a control unit 200, wherein both units are connected to one another via an interface 50. The system 10 is preferably arranged in a motor vehicle and the control unit 200 is connected to a communication bus 210 of the motor vehicle. The control unit can be designed as a telematics unit and designed for communication with a mobile radio network or a WiFi network and has a communication processor 220 for this purpose, which is connected to the vehicle bus via an input/output control unit 230 and via a further RF connection to an interface 245 for a further connection to the mobile radio network. Communication with the cellular network takes place via an RF interface 240 which is connected to an antenna unit 60. In the illustrated exemplary embodiment, the antenna unit 60 is a unit that is used by both the emergency call unit 100 and the control unit 200. The control unit also has an interface 250 via which the emergency call unit 100 can be supplied with energy and via which control commands can be transmitted between the two units 100 and 200. Furthermore, an audio interface 260 and a unit for audio processing are provided for exchanging audio data with the emergency call unit 100. The units MN BB describe a unit for the mobile radio network (mobile network), BB the baseband and AP the applications processor.

In the example shown, the interfaces 250 and 260 are part of the interface 50 for communication with the emergency call unit 100.

The emergency call unit 100 also has a communication processor 110 which is connected to an emergency antenna 120 in order to be able to communicate with the mobile radio network in an emergency if communication with the antenna 60 is no longer possible. The emergency call unit preferably receives satellite-based signals for determining the position of the unit 100 via an interface 130. An input unit 140 is also provided, which can have an emergency call button, for example, using which a user of the system can initiate the emergency call to the emergency call center. The unit GNSS BB shows the unit for position determination. Furthermore, an interface 150 can be provided for the connection to an airbag, which, like the input unit 140, can also emit a trigger signal for initiating the emergency call. A power supply 161 is also provided for emergencies. However, in a normal operating mode, the first operating mode, the emergency call unit 100 works with the power supply that is provided by the control unit via the interface 50. The power supply 161 can be designed in such a way that it is only functional for a short time and possibly only enables communication with the emergency call center, but not continuous operation of the emergency call unit. The emergency call unit can also have an audio processing unit 160 for outputting audio signals to a loudspeaker 165 or for processing microphone signals from a microphone 168 which is also provided on the emergency call unit. The loudspeaker 165 and the microphone 168 can either be designed in such a way that they are not used in the first operating mode, the normal operation, and the data are transmitted via the interface 250 to the control unit. The interface 260 can also only be used to transmit the microphone signal. The loudspeaker signal can also be processed exclusively in the emergency call unit. However, it is also possible for the audio signals to be detected and output via the components of the emergency call unit in the first operating mode as well. In the exemplary embodiment shown, the microphone 168 is the only microphone of the system 10 and the microphone signal is also transmitted directly via the audio interface 260 to the control unit 200 and processed there, in order to then be output by an audio system (not shown) of the motor vehicle. Furthermore, an audio signal for output on the loudspeaker of the emergency call system can also be transmitted via the audio interface 260 and the audio interface can also be designed as bidirectional. However, since the emergency call unit is also supposed to work alone in an emergency without a functioning control unit, the emergency call unit 100 has at least the interfaces for the loudspeaker 165 and the microphone 168.

The emergency call unit also has the interface 170 for exchanging control signals and for providing the energy supply by way of the control unit, as well as the interface 180 for exchanging the HF signals with the antenna unit 60.

As can be seen in FIG. 1, the emergency call unit is designed as a separate electronic unit and is not integrated into the control unit or telematics unit 200. In the normal operation, the emergency call unit 100 is supplied with energy by the control unit 200 and the emergency call unit 100 is controlled by the control unit 200. However, the emergency call unit has all the necessary functional units to be able to function autonomously and to be able to send an emergency call to an emergency call center without the involvement of the control unit 200.

Furthermore, it can be seen that the emergency call unit 100 is not connected directly to the vehicle bus 210, so that corresponding resources and implementation efforts can be saved, which are necessary for components that are connected directly to the vehicle bus.

Figure 2:
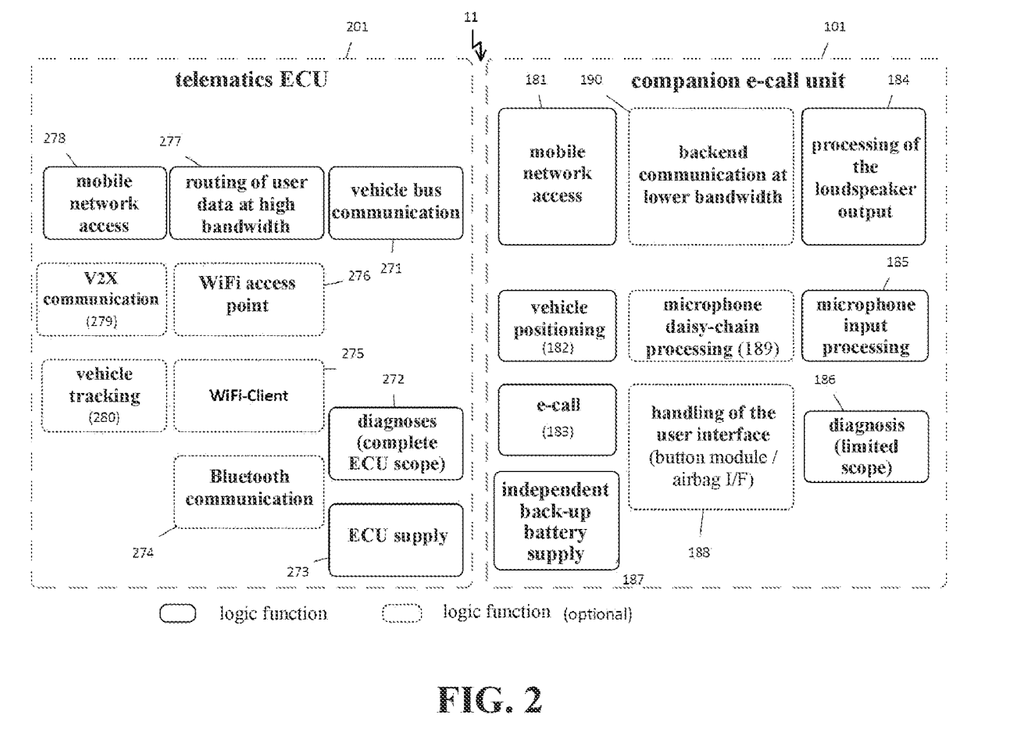
FIG. 2 schematically shows the functional architecture of the system of FIG. 1.

FIG. 2 schematically shows a further system 11 similar to the system from FIG. 1, wherein only the functional components are shown both in the emergency call unit 100 and in the control unit 200. The overall system 11 having the control unit 201 and the emergency call unit 101 is designed as follows here:

The control unit 201 has a module 271, which is designed for communication with the vehicle bus, a module 272, which is designed to identify a diagnosis and possible errors in the control unit. Furthermore, a module 273 for the power supply of the control unit 201 is provided. An optional communication module 274 is designed for Bluetooth communication with external units, the optional module 275 is designed for WIFI communication, wherein the optional module 276 forms the WIFI access point. Module 277 is designed for data communication at a high bandwidth for data communication with the Internet or the mobile network and for routing the data in the control unit, to other control units in the vehicle, and possibly to the emergency call unit 101. Module 278 enables access to the mobile network, the optional module 279 enables communication with other vehicles or other devices outside the vehicle in V2X communication, and the optional module 280 enables the position determination and tracking of the system 11 and thus the vehicle in which the system is formed.

The emergency call unit 101 has the following functional modules: a module 181 for access to the mobile network or the Internet, module 182, which is designed to determine the vehicle position, module 183 for executing the emergency call to the emergency call center. Module 184 enables audio signals to be processed and output by the loudspeaker and module 185 enables audio signals received by the microphone to be processed. Module 186 enables an error diagnosis (possibly with limited scope) in the emergency call unit 101 and module 187 ensures the power supply for emergencies if no power can be supplied via the control unit. Module 188 enables basic communication with a user, and has, for example, an emergency call button or an interface with the airbag to make an emergency call if the airbag is triggered. The optional module 189 is designed to transmit the audio signals recorded by the microphone directly to an interface without processing to allow the analog audio signals to be transmitted to the control unit 201, and the optional module 190 enables communication at lower bandwidth with the mobile radio network.

In summary, this means that the control unit has at least the functional blocks that are necessary for communication with other control units in the vehicle or with the mobile radio network/Internet. The emergency unit 101 has all the functional modules that are necessary for making an emergency call to the emergency call center, but no other functional elements are provided in the emergency call unit.

The modules 181 and 190 can be designed in such a way that they only have the necessary functions that are necessary for the emergency call. In this case, the data communication with the mobile radio network can have a lower bandwidth than the associated data communication in the control unit and cannot enable MIMO data communication, for example.

Figure 3:
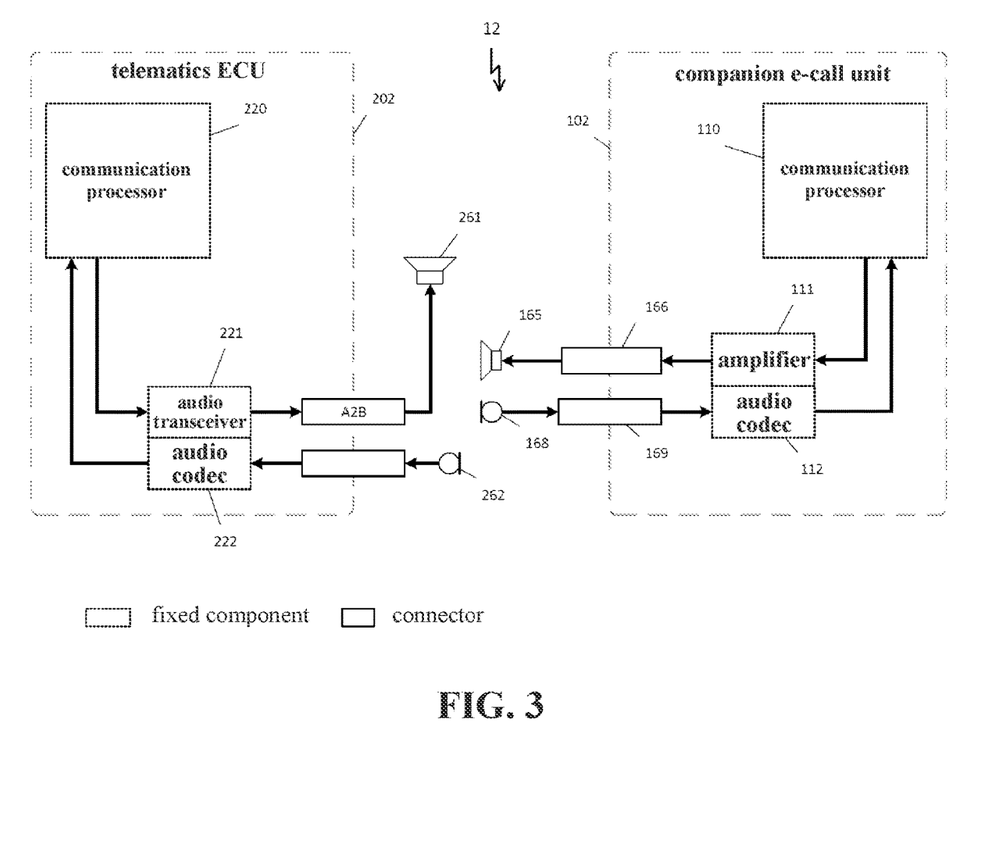
FIG. 3 shows a further possible embodiment of the system having a separate control unit and emergency call unit, wherein the latter does not communicate directly with the vehicle bus.

FIG. 3 shows a further exemplary embodiment of the system 12 having an emergency call unit 102 and a control unit 202. The components having the same reference numerals as in FIG. 1 have the same functions as the elements shown in FIG. 1 and will not be explained in further detail. In addition to the embodiment of FIG. 1, the control unit 202 has a microphone 262, so that an audio transceiver 221 and a coding unit 222 are provided for the audio signals. The coding unit 222 receives the audio signals from the microphone 262 before they are transmitted to the communications processor 220. In the embodiment shown in FIG. 3, the loudspeaker 165 and the microphone 168 are provided exclusively for the emergency call unit 102, wherein the emergency call unit has an amplifier 111 and an audio coding unit 112 for processing the audio signals from the microphone and for the audio amplifier. This means that, for example, the control unit 202 uses its own audio devices, for example for telephone calls. The microphones 168 or 262 can be connected via an analog interface or via a digital audio interface, for example A2B, or via a data interface such as Ethernet or AVB. Likewise, the loudspeakers 165, 261 can be connected via an analog or digital audio interface or via a data interface.

Figure 4:
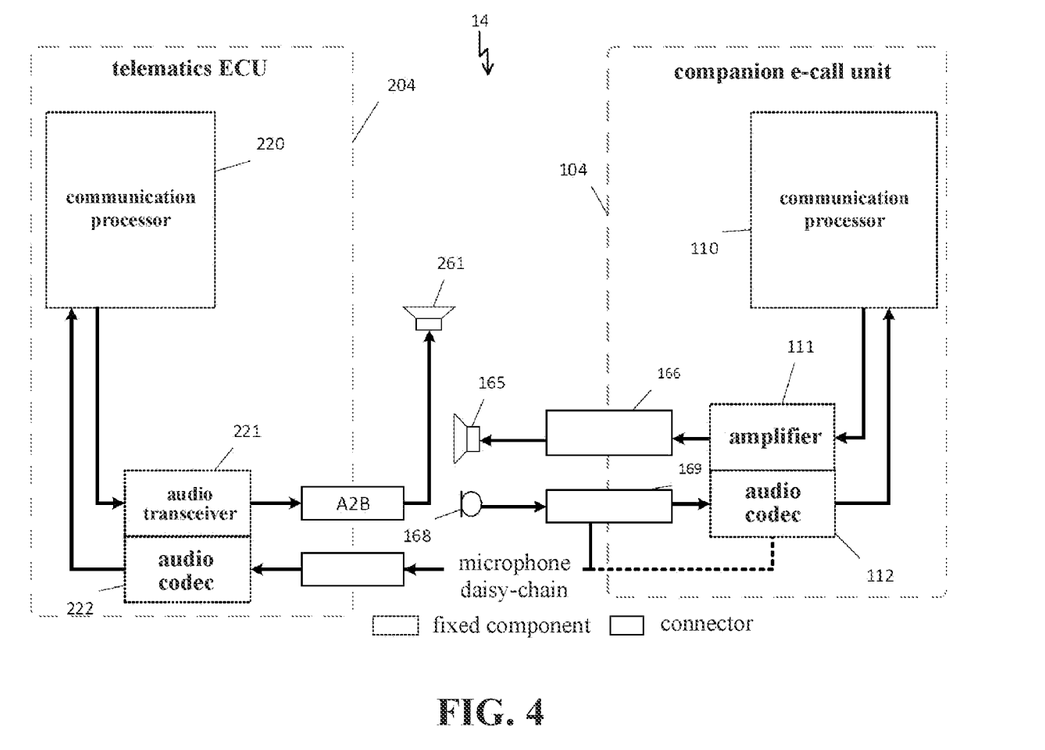
FIG. 4 shows a further schematic embodiment of the system of FIG. 3, wherein only one microphone is provided, however.

FIG. 4 shows a further exemplary embodiment, wherein in contrast to FIG. 3, only one microphone is provided and the components otherwise correspond to the components of FIG. 3, wherein the analog audio signal is transmitted from the microphone directly via an audio interface to the control unit 204, wherein prior coding by the coding unit 112 with subsequent transmission to control unit 204 is also conceivable.

Figure 5:
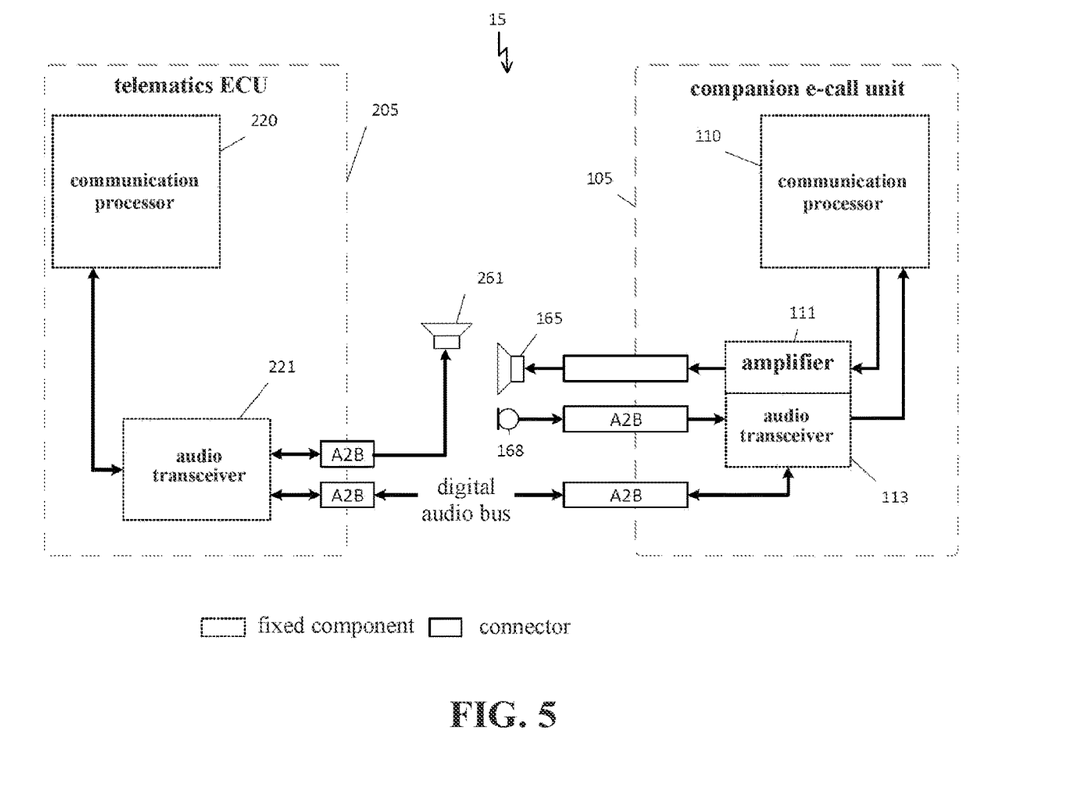
FIG. 5 shows a further schematic embodiment of a system similar to the systems shown in FIGS. 3 and 4.

FIG. 5 shows a further embodiment of a system 15 having an emergency call unit 105 and a control unit 205. Here the audio signal recorded by the microphone 168 is routed through the audio transceiver unit 113 and digitized and then routed via a digital audio bus to the control unit 205, wherein the control unit 205 has the audio transceiver unit 221 but not the audio coder 222 as in FIG. 4.

Figure 6:
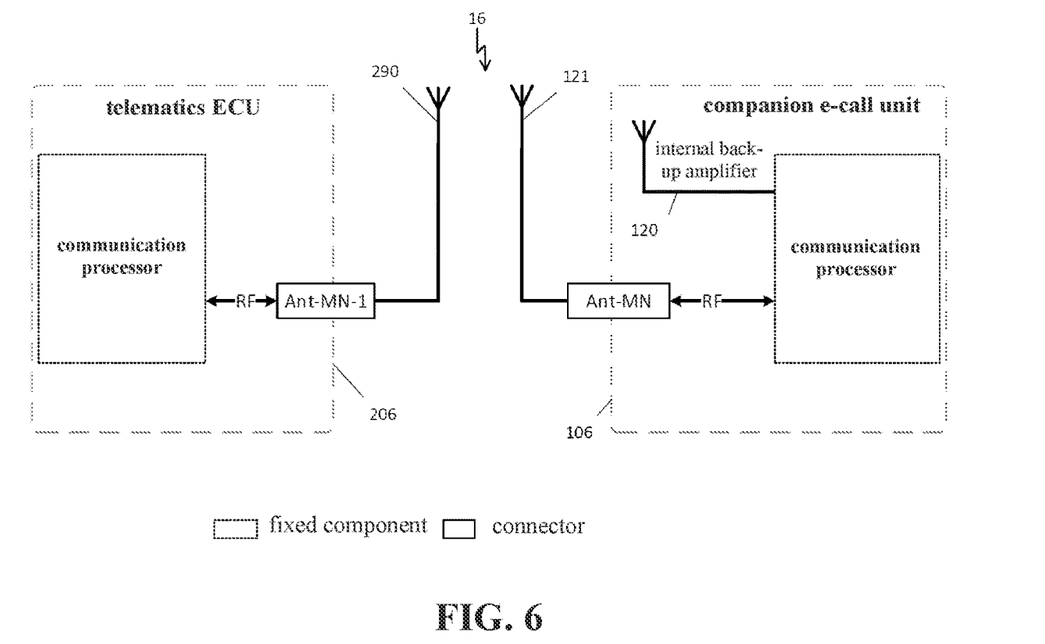
FIG. 6 schematically shows the use of two separate antennas in a system similar to the system shown in FIGS. 1 to 5.
Figure 7:
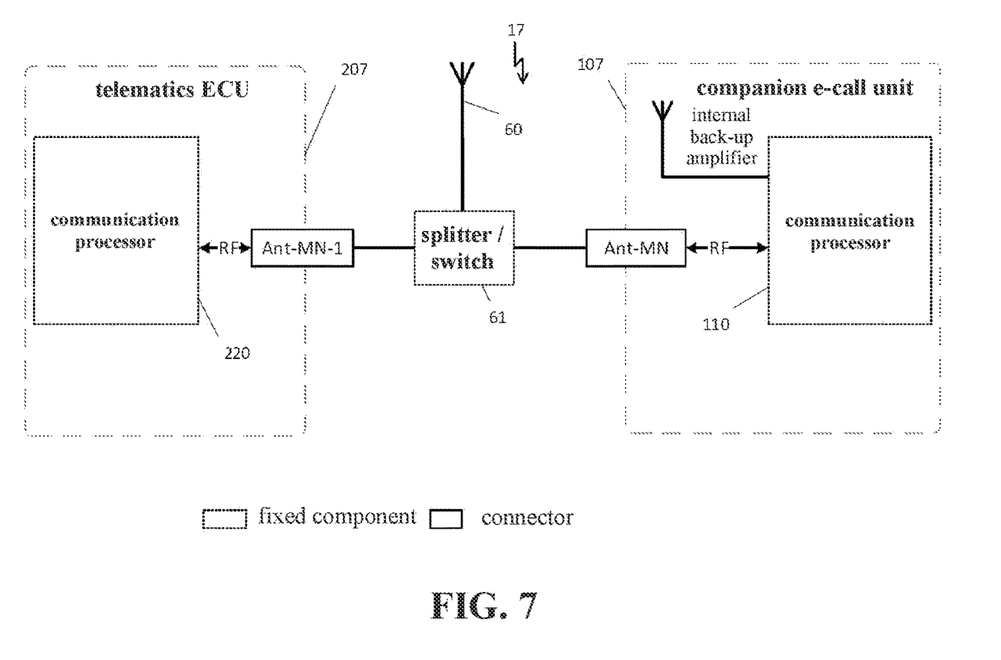
FIG. 7 schematically shows a system similar to FIG. 6, wherein only one antenna is used by both units of the system.
Figure 8:
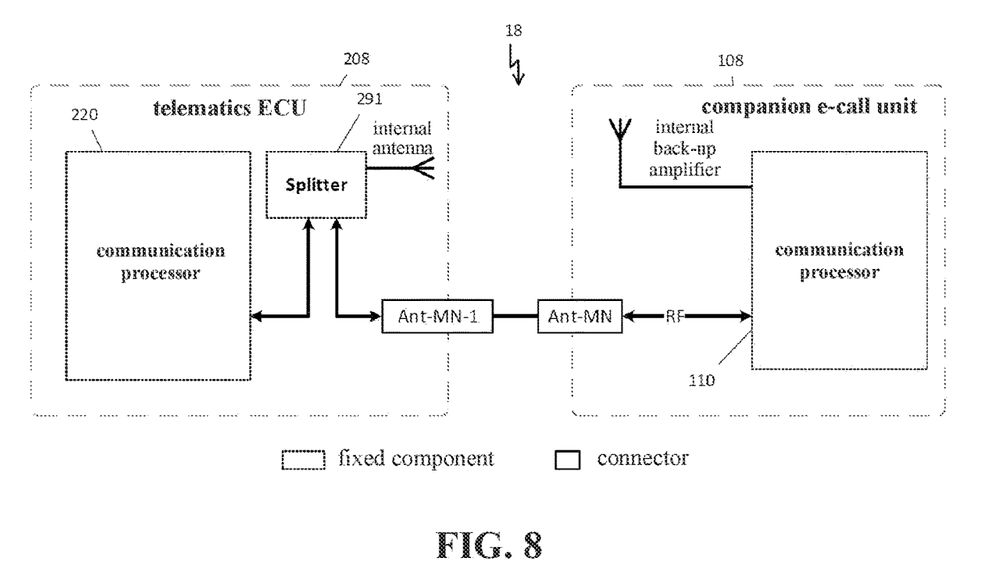
FIG. 8 shows a further example of an antenna configuration in a system similar to the systems shown in FIGS. 6 and 7.

FIGS. 6 to 8 now show different ways in which a connection via an antenna to the mobile radio network is possible.

FIG. 6 shows a system 16 having an emergency call unit 106 and the control unit 206, wherein each unit uses its own antenna for communication with the mobile network, the emergency call unit 106, in addition to the emergency antenna 120, its own antenna 121, which is used for communication with the mobile radio network. Similarly, the control unit 206 has one or more separate antennas 290 for communication with the mobile radio network.

FIG. 7 shows a similar embodiment, wherein only the commonly used antenna 60 is used, so that the system 17 has an emergency call unit 107 and a control unit 207, wherein the received antenna signal is split by a splitter 61 and conducted to the two units 107 and 207. The splitter 61 can be inside the antenna, outside the antenna, or in one of the two units 107 or 207. Alternatively, the functional block 61 can also be designed as a switch that connects the antenna signal either to the emergency call unit 107 or to the control unit 207 as desired. In addition, the control unit can also have other antenna interfaces that are provided for exclusive use by the control unit.

FIG. 8 shows a system 18 having a control unit 208 and an emergency call unit 108, wherein the splitter 291 is provided within the control unit and the signals are supplied from there to the communication units 220 and 110. The emergency call unit 108 and the control unit 208 thus use the same physical antenna for access to the mobile radio network.

The invention claimed is:

1. A system for a motor vehicle having:
   a control unit which is connected to a communication bus of the motor vehicle, an emergency call unit which is designed to make an emergency call to an emergency call center, wherein the emergency call unit is connected to the control unit via an interface and can operate in a first operating mode, which corresponds to normal operation of the emergency call unit, in which the control unit controls the emergency call unit and supplies it with energy via the interface, and in a second operating mode, in which the emergency call unit is designed to make the emergency call to the emergency call center without control and energy by way of the control unit, wherein the emergency call unit is only connected via the interface and not directly to the communication bus, wherein:
   the emergency call unit has an audio processing unit which is designed to process audio signals, and at least one loudspeaker interface for outputting the processed audio signals, wherein the emergency call unit is designed to output the processed audio signals in the second operating mode via the at least one loudspeaker interface, and, in the first operating mode, to send the processed audio signals via the interface to the control unit without output via the at least one loudspeaker interface of the emergency call unit;
   only the emergency call unit has a microphone interface and is designed to transmit the audio signals recorded by a microphone to the control unit via the interface; and
   the emergency call unit has a coding unit for the audio signals for generating digital audio signals, wherein the emergency call unit is designed to transmit the digital audio signals generated by the coding unit to the control unit via the interface.

2. The system as claimed in claim 1, wherein the emergency call unit has a reserve antenna and a reserve power supply, with which the emergency call unit makes the emergency call to the emergency call center in the second operating mode, wherein the emergency call unit has a position determination unit which, in the second operating mode, is designed to determine a position of the system and to send the position in the emergency call to the emergency call center.

3. The system as claimed in claim 1, wherein the control unit has a first operating unit, via which a user of the system, in the first operating mode, controls the emergency call unit via control commands that are transmitted via the interface, wherein the emergency call unit has a second operating unit, using which the user can operate the emergency call unit in the second operating mode.

4. The system as claimed in claim 1, which furthermore has a common antenna which, in the first operating mode, is used by the emergency call unit and the control unit for communication with a mobile radio network.

5. The system as claimed in claim 4, wherein the system comprises a splitter or switch which splits a received antenna signal and transmits it to the emergency call unit and the control unit.

6. The system as claimed in claim 1, wherein both the emergency call unit and the control unit each have a microphone interface for recording audio signals.

7. The system as claimed in claim 1, wherein the emergency call unit is designed to transmit the recorded audio signals as analog signals via the interface to the control unit.

8. The system as claimed in claim 1, wherein the control unit has at least one of the following units:
   a WIFI interface,
   a Bluetooth interface,
   a V2X communication unit,
   a power supply for the control unit and the emergency call unit.

9. The system as claimed in claim 1, wherein the control unit has a communication unit for exchanging data with a mobile radio network and/or the Internet, wherein the emergency call unit is designed to carry out the data exchange with the mobile radio network via the communication unit in the control unit in the first operating mode.

* * * * *